United States Patent [19]

Sellers

[11] Patent Number: 5,189,601
[45] Date of Patent: Feb. 23, 1993

[54] HALF BRIDGE CONVERTER WITH CURRENT MODE CONTROLLER

[75] Inventor: Jeff C. Sellers, Palmyra, N.Y.

[73] Assignee: ENI Div. of Astec America, Inc., Rochester, N.Y.

[21] Appl. No.: 793,477

[22] Filed: Nov. 18, 1991

[51] Int. Cl.$^5$ .................. H02M 3/335; H02M 7/5387
[52] U.S. Cl. ........................................ 363/21; 363/132
[58] Field of Search ................... 363/17, 56, 21, 132, 363/95, 98

[56] References Cited

U.S. PATENT DOCUMENTS

| | | | |
|---|---|---|---|
| 3,790,878 | 2/1974 | Brokaw | 323/17 |
| 4,456,872 | 6/1984 | Froeschle | 323/286 |
| 4,631,653 | 12/1986 | Small | 363/17 |
| 4,719,559 | 1/1988 | Sokal et al. | 363/98 |

OTHER PUBLICATIONS

Redl, Richard et al., What a Design Engineer Should Know About Current Mode Control, IEEE Power Electronics Design, Conf., 18-33 1985.
Unitrode, Power Supply Design Seminar Handbook, Sem 600A, A1-1–A1-6, 1988.

Primary Examiner—Steven L. Stephan
Assistant Examiner—Adolf Berhane
Attorney, Agent, or Firm—Wall and Roehrig

[57] ABSTRACT

A dc-dc converter employs both half-bridge topology and current-mode switching control. The controller operates by sensing the current that flows through the transformer that is interposed between the node of two series switches and the node between the two split capacitors. The controller develops gating signals to close and open the switches based on the rise of current to a predetermined command level. A gate signal for the second switch, which is developed between actuations of the first switch, has its pulse width made equal to the period that the first switch was closed. This maintains a balanced voltage-time product, so that the series or split capacitors remain in balance. The controller can include a sample gating circuit with a comparator that receives the current sample signal and the command level. The track side signal which develops the gating pulse for the other switch can be developed with analog circuitry, i.e. by charging a capacitor, or else digitally, i.e. by clock pulse counting.

6 Claims, 6 Drawing Sheets

HALF BRIDGE CONVERTER WITH CURRENT MODE CONTROLLER

BACKGROUND OF THE INVENTION

This invention is related to dc-dc type power converters, and is especially directed to power converters of the half-bridge type. The invention is more particularly concerned with a novel current mode controller for a half-bridge power converter.

A half bridge converter, in its most basic terms, has dc power input leads, a pair of capacitors in series across the power input lead and a pair of switches also in series across the power input leads. A transformer has its primary coupled between the junction of the switches and the junction of the capacitors. The transformer secondary has a grounded center tap and end terminals connected through rectifier diodes to an output inductor, followed by a smoothing capacitor and a load resistor.

Switching is controlled by a current mode controller. The current through the transformer primary, i.e., the current through the output inductor, is sensed and a current sense signal is supplied to the controller. The controller turns the switches on in turn and turns them off when the peak sensed current reaches a command level. This produces a drive current with a pulse width through that is controlled as a function of current demand.

The half-bridge converter can employ switching devices one half the voltage rating of other types of converters, and the half-bridge topologies makes more efficient use of the transformer core and windings than other topologies. Leakage inductance energy is returned to the input capacitors, rather than being resistively dissipated. Current-mode control facilitates compensation and gives enhanced large signal performance. Because current-mode control has input voltage feed forward characteristics, this type of control provides good output regulation in the event of input line voltage fluctuation.

Current-mode control has the advantages of reduced output phase delay at the frequencies employed, and typically up to 7000 Hz, as compared with other control systems, such as constant frequency PWM. This gives the converter a rapid response to demand and permits it to operate at peak efficiency.

Half-bridge topology with current-mode control has been considered as an unstable combination because of the difficulty in balancing the capacitors. That is, because the two capacitors will not have exactly the same values, more charge is transferred to one than to the other in each cycle. Current mode control is designed to keep peak current equal in both phases. Consequently, the half cycle with the smaller value capacitor will produce a shorter pulse width. This means that the voltage at the junction of the capacitors will increase or decrease a small amount with each cycle, and after a short time will equal zero or full voltage.

In order to avoid this, the present state of the art employs an auxiliary transformer winding with the same number of turns as the transformer primary winding, but of small diameter wire, and a pair of small high-voltage diodes. The diodes provide a current path to the capacitors to keep them in balance.

While the auxiliary winding and diode arrangement does reduce the instability of the current mode control design, it also reduces the overall efficiency, by as much as 30%. That is an additional 30% of power is consumed in the auxiliary windings and diodes.

OBJECTS AND SUMMARY OF THE INVENTION

It is an object of the present invention to provide a stable, efficient current mode controller for a half-bridge power converter.

It is another object of this invention to provide a current-mode controlled half-bridge power converter that avoids the drawbacks of the prior art.

It is a further object of the invention to provide a half-bridge converter which operates in a balanced fashion without resort to additional power-consumptive circuitry in the converter.

In accordance with an aspect of this invention half-bridge converter is provided with a current-mode controller. The controller operates by sensing the current that flows through the transformer when one of the two series switches is closed, and opens this switch when the current reaches a given command level. The controller then develops a gate signal to close the second switch between actuations of the first switch. This gate signal has a pulse width equal to the period that the first switch was closed. This maintains a balanced volt second product so that the series or split capacitors stay in balance. This arrangement obtains the advantages of both half-bridge operation and current-mode control without instability problems and without requiring a supplemental or balance transformer winding and diodes, with their accompanying loss of efficiency.

In any of several preferred embodiments the converter has first and second series capacitors connected between positive and negative input current conductors and first and second controlled switches connected in series between the input current conductors, each having a control or gating electrode. A transformer has its primary winding joining the node between the switches and the node between the capacitors. A half-bridge rectifier circuit is coupled to the transformer secondary, and includes an output inductor. A current sensor, which can be a small transformer, samples the current that flows through the transformer primary and provides a current sample signal to the current mode controller.

The controller has an input to receive the current sample signal, a reference input to which a voltage or current is applied to represent the command level, and first and second gate outputs that are coupled to provide gating signals to the gate electrodes of the first and second switches.

A sample gating circuit in the controller has a comparator with inputs that receive the current sense signal and the command level, and an output coupled to a wave shaping circuit that develops the first gating signal, which is applied to the gate electrode of the first switch. This gate signal closes the switch and then opens it when the current through the transformer rises to the command level. For each occurrence of the first gating signal, the pulse width is determined by the rise of transformer current to the command level.

A track gating circuit is coupled to the sample gating circuit and generates a second gating signal between occurrences of the first gating signal. The second gating signal mimics the first gating signal and is produced to have a pulse width equal to the width of the next previous occurrence of the first gating signal. The second gating signal is then applied, between occurrences of the first gating signal, to the gate electrode of the second switch. This ensures that current flows the same length of time in both directions, regardless of small differences in values of the two capacitors, and ensures that the capacitors operate in balanced fashion. This technique avoids the need for the additional winding and the diodes mentioned earlier, and thus permits balanced operation without loss of efficiency, while retaining all the advantages of both current-mode control and half-bridge converter operation.

The track gating circuit can be implemented with analog circuitry, e.g., by charging and discharging a timing capacitor, or digitally, e.g., with a clock pulse generator and counter circuits.

The above and many other objects, features, and advantages of this invention will be better understood from the ensuing description of certain preferred embodiments of the invention, to be read in connection with the accompanying Drawing.

DETAILED DESCRIPTION OF THE PREFERRED EMBODIMENTS

Figure 1:
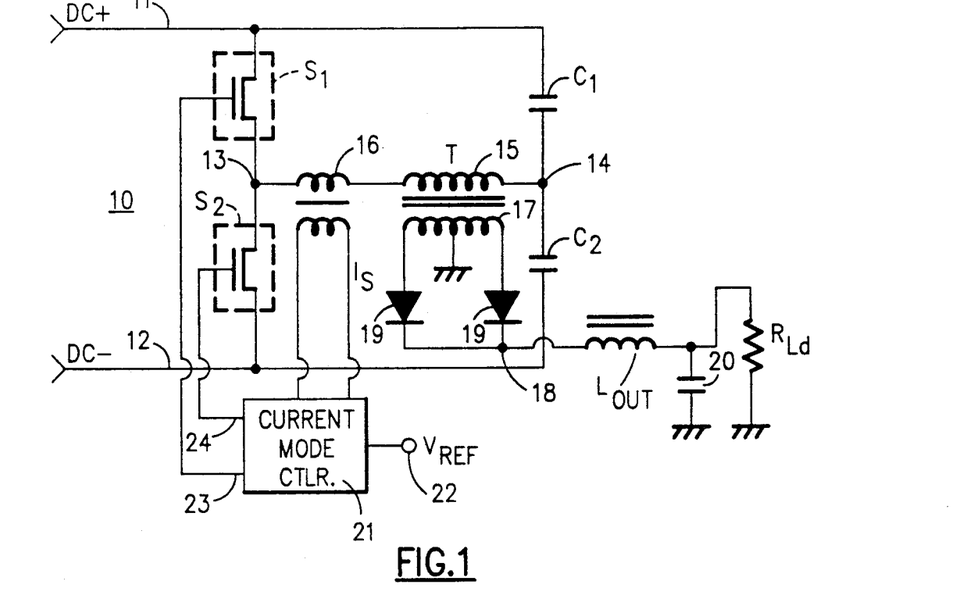
FIG. 1 is a schematic view of a half-bridge converter circuit with a current-mode controller according to this invention.

With reference to the Drawing and initially to FIG. 1, a half-bridge dc-dc power converter 10 has a positive power conductor 11 and a negative power conductor 12 with a pair of switches S1 and S2. The switches S1 and S2 have their current carrying conductors connected in series between the dc power conductors 11 and 12, and define a node 13 between them. There are also a pair of capacitors $C_1$ and $C_2$ connected in series between the conductors 11 and 12 and in parallel with the series switches S1 and S2. The capacitors C1 and C2 define between them another node 14. A power transformer T has a primary winding 15, coupled between the nodes 13 and 14, and a current sensing transformer 16 is connected in series with the transformer primary 15. The transformer T has a secondary winding 17 with a grounded center tap and coupled to a half-bridge rectifier 18 which comprises a pair of rectifying diodes 19,19 followed by an output inductance $L_{out}$, a smoothing capacitor 20 and a load resistor $R_{ld}$. The current-sensing transformer 16 provides a sense current $I_s$ to a current mode controller 21 which also has a reference input 22 to which a reference voltage or command level voltage $V_{ref}$ is applied. The controller 21 has respective outputs 23 and 24 which supply gating pulses to gate electrodes of the switches S1 and S2, which are here shown as FETs.

Figure 2:
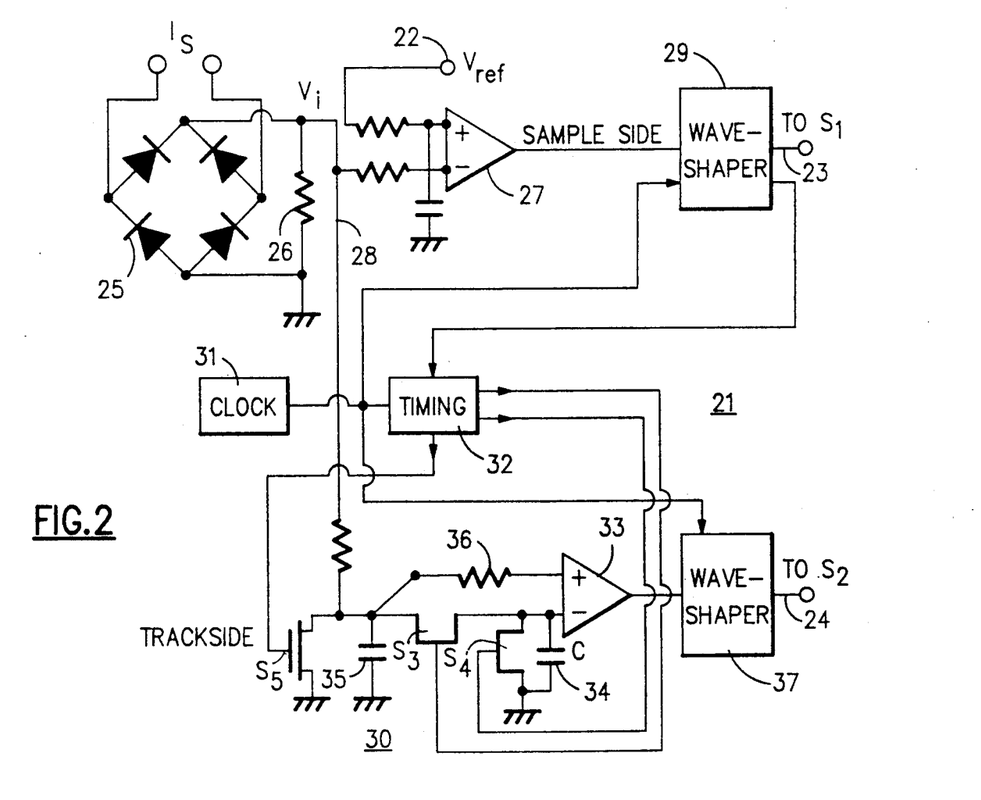
FIG. 2 is a basic schematic diagram of a current mode controller of one embodiment of this invention.

One embodiment of the current load controller 21, which incorporates the basic principles of this invention, is shown in principle in FIG. 2. In the controller 21, a bridge rectifier circuit 25 receives the sense current $I_s$ and produces a corresponding current sense voltage $v_i$ across a load resistor 26. This voltage $v_i$ is applied to one input terminal of a sample-side comparator 26. The complementary input terminal of the comparator 27 is coupled to the reference input 22 to receive the command level reference voltage $V_{ref}$. The output of the sample-side comparator 27 is applied to a wave-shaper circuit 29, which can for example include a flip flop, the output of which is coupled to the output 23 to control the switch S1. The wave-shaper circuit 29 develops the sample-side gating circuit as a pulse width modulated (PWM) signal which shuts the switch S1 off when the sample voltage $v_i$ equals the command level reference voltage $v_{ref}$. An input lead 28 is connected to the load resistor 26 and carries the current sense voltage $v_i$ to the comparator 27 and also to a track-side controller circuit 30. The track-side circuit 30 includes a clock circuit 31 which is a source of clock pulses that are supplied to a timing and synchronizing circuit 32 which has another input connected to an output of the wave shaper 29, and timing outputs connected to switches S3, S4, and S5 to be described shortly.

A track-side comparator 33 has one input terminal coupled to a timing capacitor 34, which is coupled through the switch S3 to the input lead 28, and with the switch S4 connected in parallel to it. A timing capacitor 35 which is connected in parallel to the switch S5 has one end coupled to the input lead 28, and is also connected to the switch S3 and through an input resistor 36 to the complementary input of the track-side comparator 33. A wave shaper 37, which can incorporate a flip-flop, provides at the output 24 a track-side gating pulse that has the same duration as the next previous occurrence of the sample-side gating pulse.

The timing circuit 32 is operative, at each occurrence of the sample-side pulse, to momentarily close the switch S4 and discharge the tracking capacitor 34. Then the switch S4 is opened and the switch S3 is closed. This permits the tracking compacitor 34 to charge. When the current sense voltage $V_i$ equals the command level reference voltage $V_{ref}$ the output of the comparator 27 changes state, and at this time the timing and synchronizing circuit 32 opens the switch $S_3$ to isolate the capacitor 34. At the onset of the next clock pulse from the clock circuit 31, the wave shaper 37 commences the track-side gating pulse, and the timing capacitor 35 begins to charge. When the voltage on the capacitor 35 equals that on the tracking capacitor 34, the output of the comparator 33 changes state and the wave shaper 37 terminates the gating pulse that is supplied from the output terminal 24 to the second gate S2.

It can be seen that with the track side controller circuit 30, the second or track-side gating pulses have their pulse width determined by the pulse width of the sample side gating pulses, regardless of the behavior of the sample current $I_s$ during the time that the track-side gating signals are being produced. This means that the switches S1 and S2 will be closed for the same length of time on consecutive halves of a cycle, so that the capacitors $C_1$ and $C_2$ will operate in balanced fashion, notwithstanding any difference in value as between these two capacitors. Therefore, with this sample and tracking current mode control scheme, there is no tendency of the voltage at the node 14 to creep to the level of either the positive or negative conductors 11, 12.

Figure 3:
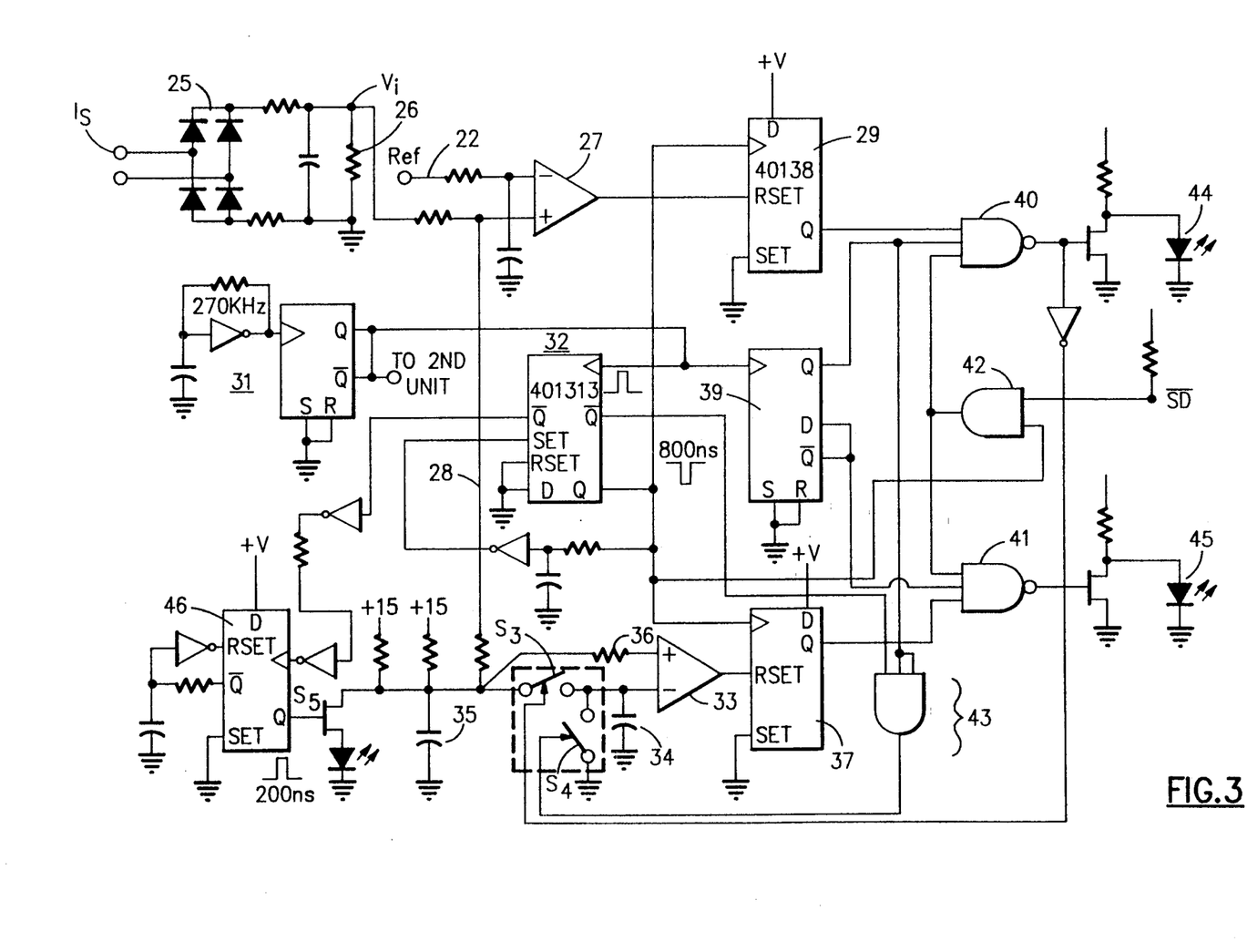
FIG. 3 is a more detailed circuit diagram of the FIG. 2 embodiment.

A more detailed schematic view of an implementation of the FIG. 2 embodiment is shown in FIG. 3. The elements shown in this view and which are also shown in FIG. 2 are identified with the same reference characters, and a detailed description is omitted. It can be seen that the clock signal generator 31 is comprised of a conventional inverter-based oscillator followed by a flip-flop whose output is coupled to the timing and synchronizing circuit 31, which is formed of flip-flops 38 and 39. The sample-side wave shaper circuit 29 and the tracking side wave shaper circuit 37 are each formed of a flip flop where the clock input is provided from the output of the flip flop 38, and whose reset terminal is coupled to the respective comparator 27 or 33. The flip-flop 39, which alternates states at successive applications of the timing pulses, has one input coupled to a logic AND gate 40 which has another input coupled to the flip flop 39. The inverted output of the flip flop 39 is coupled to another logic AND gate 41 which has another input coupled to the output of the flip flop 37. A logic AND gate 42 has an input coupled to the output of the flip flop 38 and its output is coupled to respective inputs of the gates 40 and 41. The output of the gate 40 is used to gate the switch S3, and another logic AND gate 43 whose inputs are coupled to outputs of the flip-flops 38 and 39 is used to gate the switch S4. The outputs of the gates 40 and 41 respectively actuate photoemitters 44 and 45 that are coupled to actuate the converter switches S1 and S2. Another flip-flop 46 actuates the switch S5 shortly after the onset of each clock pulse.

It should be appreciated that this circuit could be implemented in many other forms without varying the main principles of its operation.

Figure 4:
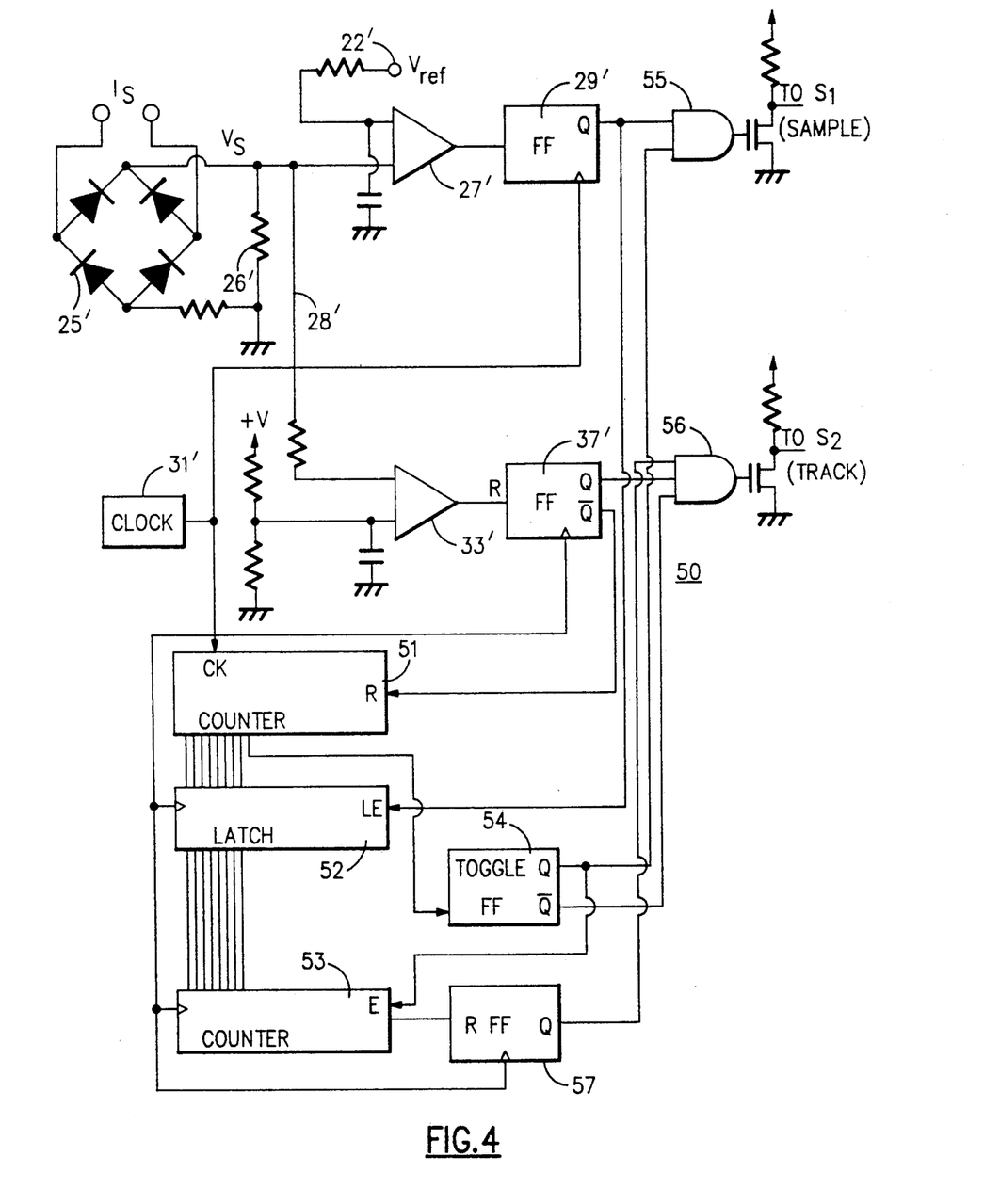
FIG. 4 is a basic schematic diagram of a current mode controller of another embodiment of this invention.

Another embodiment of this invention is shown in FIG. 4, which incorporates a digital implementation. Here, those elements that correspond to similar elements in the previous embodiment are identified with similar reference numbers, but primed, and a detailed description thereof is omitted. As in the previous embodiments, sample current $I_s$ is applied through the bridge rectifier 25' and the command level voltage is applied through the terminal 22', so that the voltages $V_{ref}$ and $V_{ir}$ apply to the sample-side comparator 27', whose output is coupled to a flip-flop 29'. The conductor 28' also couples the voltage $V_i$ to the additional comparator 33', whose output resets the track side flip-flop 37'. A clock signal generator 31' supplies clock pulses to the flip-flops 29', 37'.

A digital track-side circuit 50 includes a first counter circuit 51 with a clock input coupled to the source 31 and a reset terminal coupled to the inverted output of the flip flop 37'. This counter circuit 51 is arranged to count up, and has its data terminals coupled to a latch circuit 52. The latter receives the clock signals and also receives an enable signal from the output of the sample-side flip-flop 29'. Another counter 53 receives the count from the counter 51 as latched by the circuit 52 and this count is applied to data inputs to the counter 53. The latter counter 53 counts down to a predetermined number, e.g. FF.

A toggle flip-flop 54 receives a toggle signal from the first counter 51 when it reaches a predetermined count. The normal output of the flip-flop 54 provides an enable signal to the counter 53, and also provides a high level to a logic AND gate whose other input is supplied from the flip flop 29'. The inverted output of the flip-flop 54 is supplied to a logic AND gate 56 which has another input coupled to the normal output of the track-side flip-flop 37' and a further input coupled to the output of an additional flip flop 57. This flip-flop is set by the clock pulses and is reset by the counter 53. The output of the logic AND gate 55 provides a pulse width modulated gating signal to the switch S1 and the logic and gate 56 provides the gating signal that is supplied to the switch S2. The width of the track-side gating pulse signal supplied from the logic AND gate 56 is governed by the number of clock pulses counted by the counter 53. Because this equals the number of clock pulses counted by the counter 51 during the next previous occurrence of the gating signal which is applied to the switch S1, the two gating signals will have substantially the same pulse width. This permits the converter to operate in a stable, balanced fashion, as the transformer current flows for the same length of time in both directions through the transformer T.

Figures 5, 5A:
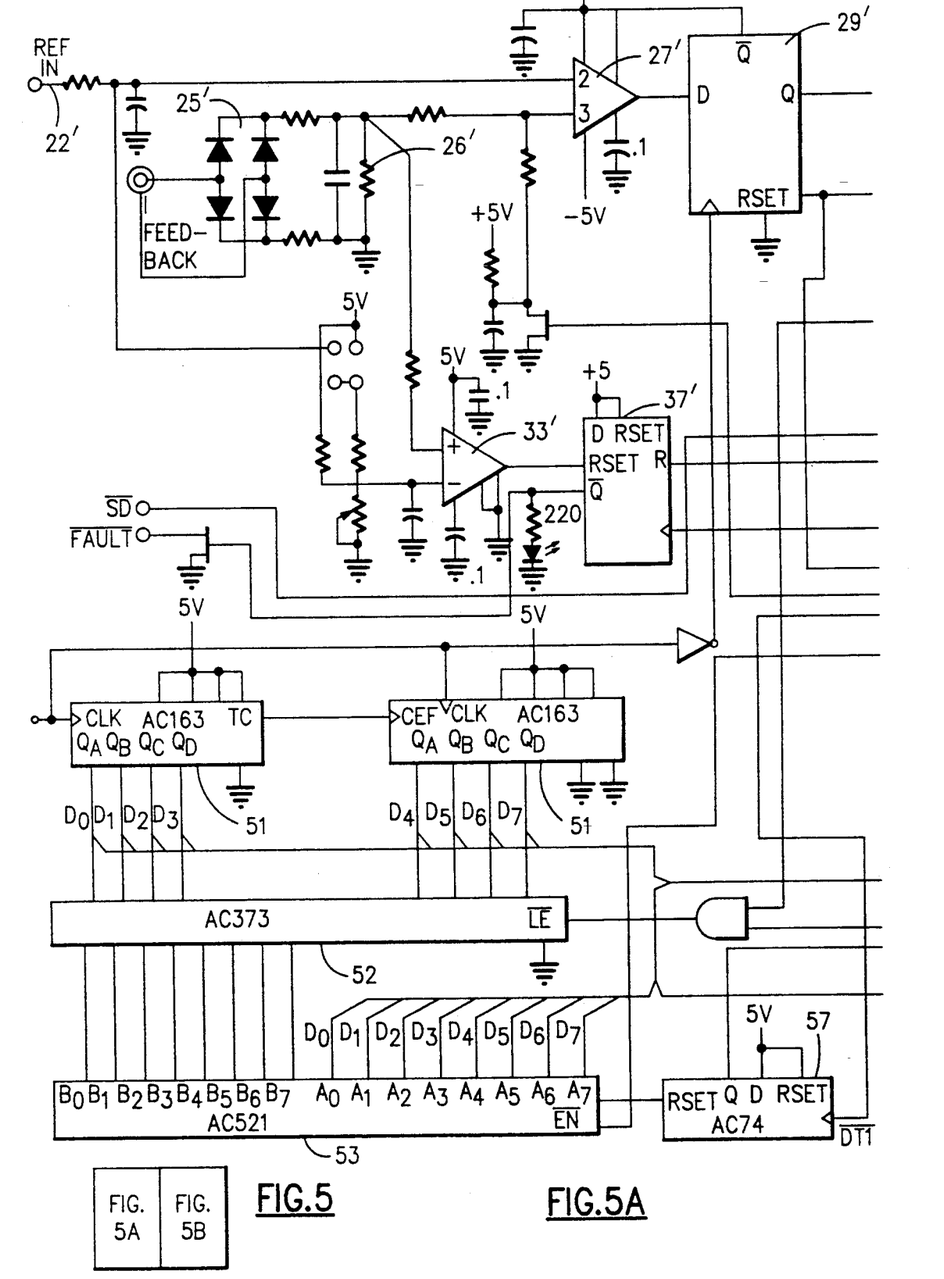
FIGS. 5, 5A and 5B are a more detailed circuit diagram of the FIG. 4 embodiment.
Figure 5B:
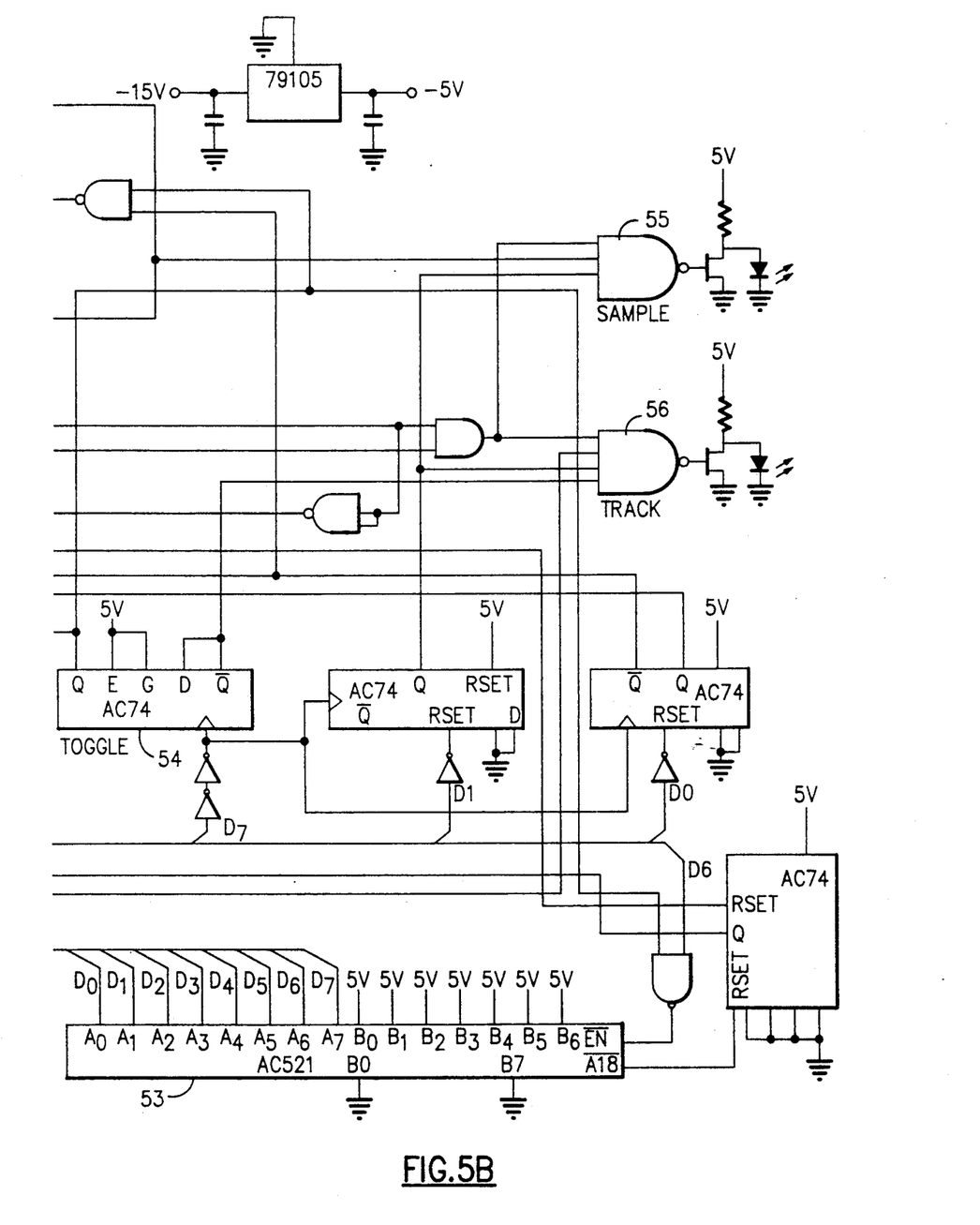

A more detailed schematic of an implementation of the embodiment of FIG. 4 is shown in FIG. 5, where the elements employed in FIG. 4 are identified with the same reference numbers. Of course, many implementation details would be understood with those in the art, and do not require detailed explanation. This schematic view shows one of the many ways the circuit could be implemented.

Figure 6:
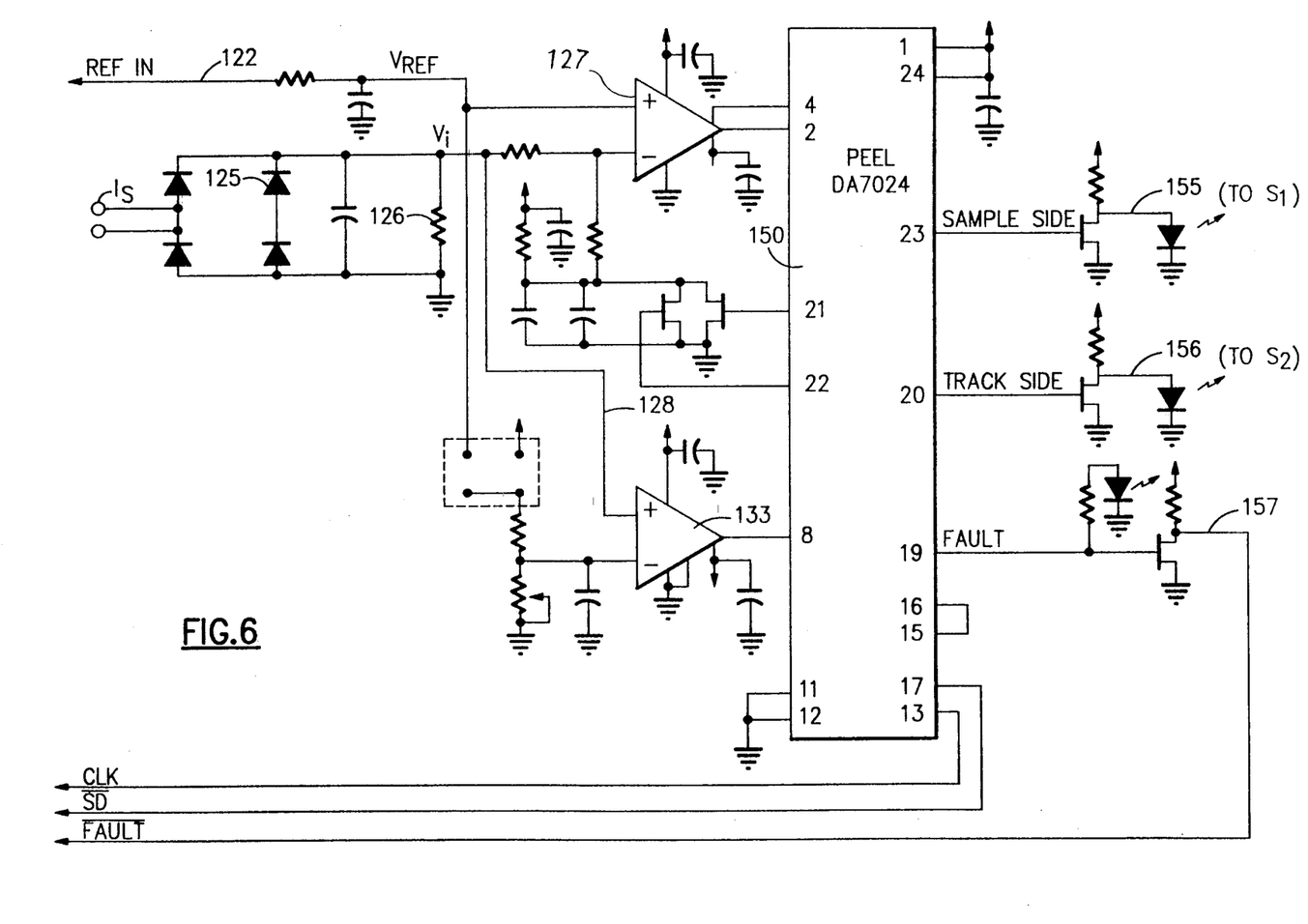
FIG. 6 is a circuit diagram of a further embodiment.

FIG. 6 shows a current mode controller based on a programmable electrically erasable logic array, or PEEL 150. This can be implemented as a type PA7024 integrated circuit, in which connections would be made to the pin numbers as shown in this drawing view. Here, elements that correspond to similar elements in the previous embodiments are identified with the same reference numbers as before, but raised by 100. That is, the input sample-current $I_s$ is applied through the diode bridge 125 to the load resistor 126, which, develops the sample current $V_i$ that is applied to the sample side comparator 127. The output of this comparator is applied to pins 2 and 4 of the PEEL 150. The command level reference voltage $V_{ref}$ is applied through a reference level input 122 to the comparator 127. A conductor 128 couples the comparator 127 to a second comparator 133, whose output is coupled to the input terminal 8 of the PEEL 150. The PEEL also has output interfaces 155 and 156 corresponding to the sample-side and track-side gate signal outputs, and these are photo-optically coupled to the switches S1 and S2 of FIG. 1. Another interface 157 provides a fault indication. There are also additional outputs CLK and SD. Again, the controller shown in FIG. 6 is one of many possible implementations, with the PEEL 150 being suitably programmed to operate in a fashion similar to the embodiment of 4 and 5.

While this invention has been described in detail with reference to certain preferred embodiments, it should be understood that the invention is not limited to those precise embodiments. Rather, many modifications and variations would present themselves to those of skill in the art without departing from the scope and spirit of this invention, as defined in the appended claims.

What is claimed is:

1. Current-mode controlled half-bridge power converter which comprises a source of dc electrical current including a positive conductor and a negative conductor; first and second capacitors of substantially the same value and connected in series between the positive and negative conductors, the capacitors defining a node therebetween; first and second controlled switches each having a gate terminal and current carrying electrodes, said switches being coupled in series between the positive and negative conductors and defining a node between said switches; a transformer having a primary winding coupled between said nodes to conduct current when either of said switches is closed, and a secondary winding; a half-bridge rectifier circuit coupled to said secondary winding, and including an output inductor through which output current flows; a current sensor coupled to said transformer and supplying a current sample signal that varies with the current flowing through said transformer; and a current-mode controller having an input to receive said current sample signal, a reference input to which a command level is applied, and first and second gate outputs respectively coupled to the gate terminals of said first and second switches; wherein said current-mode controller includes a sample gating circuit having a comparator with inputs to receive said current sample signal and said command level and an output coupled to a wave shaping circuit that develops a first gating signal applied to said first gate output to close said first switch and open same when the current through said transformer rises to said command level, each occurrence of said first gating signal having a pulse width that depends on said rise of current to said command level; and a track gating circuit for generating a second gating signal having a pulse width equal to the width of a most recent occurrence of said first gating signal, and applying said second gating signal to said second gate output between occurrences of said first gating signal, so that current flows to said capacitors through said transformer in both directions in a balanced fashion.

2. Current mode controlled half-bridge power converter according to claim 1, wherein said track gating circuit includes a second comparator having inputs and an output, a tracking capacitor coupled to one input of said second comparator, a timing capacitor coupled to the other input of said second comparator, a conductor connecting said tracking capacitor to said current sample signal, and gating means coupled to the timing capacitor to discharge said tracking capacitor and then couple same to said conductor for charging said tracking capacitor to a level that corresponds to the width of the first gating signal, and means for charging said timing capacitor to a level that corresponds to the voltage on said tracking capacitor, and wave shaping means being coupled to the output of said second comparator to develop said second gating signal.

3. Current mode controlled half-bridge power converter according to claim 2, wherein said track gating circuit includes a source of clock pulses, a timing logic means with inputs circuit coupled to the wave shaping circuit of said sample gating circuit and to said source of clock pulses, and outputs delivering control signals to the gating means associated with said tracking capacitor and to said means for charging said timing capacitor.

4. Current mode controlled half-bridge power converter according to claim 3 wherein said timing logic means includes a flip-flop having an input coupled to said source of clock pulses and a pair of complementary outputs, and at least one logic gate having an input coupled to one of said flip flow outputs, another input coupled to an output of the sample gating circuit wave shaping circuit, and an output providing said control signal to the gating means associated with said tracking capacitor.

5. Current mode controlled half-bridge power converter according to claim 1 wherein said track gating circuit includes a source of clock pulses, first counter circuit means counting said clock pulses commencing a count thereof at the onset of each occurrence of said first gating signal, second counter means having a plurality of data inputs, a clock input receiving said clock pulses, and an output that changes state when said second counter means attains a predetermined count, latch means for latching the count of said first counter means to the data inputs of said second counter means at the end of said occurrence of said first gating signal so that the count latched to the second counter means corresponds to the pulse width of the first gating signal, and logic circuit means connected to outputs of said first and second counter means to produce said second gating signal with its pulse width corresponding to the count latched onto said second counter means.

6. Current-mode controlled half-bridge power converter according to claim 1 wherein said track gating circuit includes a programmable logic array having an input coupled to the output of said sample gating circuit comparator, and outputs that respectively provide said first and second gating signals.

* * * * *